Feb. 13, 1962  C. C. MINTER  3,021,495

RATIO-MEASURING CIRCUIT

Filed Jan. 11, 1961

INVENTOR

Clarke C. Minter 3,021,495
RATIO-MEASURING CIRCUIT
Clarke C. Minter, 3136 Dumbarton Ave.,
Washington 7, D.C.
Filed Jan. 11, 1961, Ser. No. 82,078
2 Claims. (Cl. 338—176)

This invention relates to electrical measuring apparatus in general and describes in particular a novel resistance bridge circuit for indicating the ratio of two variable quantities.

Prior art devices for measuring or indicating the ratio of two variable quantities are known. Among electrical instruments for measuring the ratio of two variable quantities is the well-known ratiometer for indicating the ratio of two electrical currents. The ratio of two variable resistances can be measured by means of a balanced Wheatstone bridge. Mechanical devices have been employed to indicate the ratio of two pressures, or to indicate the magnitude of some other variable quantitatively related to the ratio. Such a quantity is the angle of attack of an airfoil which is a function of the ratio of two pressures at different points on the surface of the airfoil. In addition, the density of a gas is proportional to the ratio of its pressure to its absolute temperature. In the mechanical devices mentioned above, the ratio measured is indicated directly by a pointer mechanically actuated to move over a calibrated scale.

It is clear that measurement of the ratios of many different variables could be more conveniently made if the two mechanical forces involved in the ratio are first converted to changes in two parts of an electric circuit so that the desired ratio can be electrically indicated or recorded. A basic circuit described in my prior art Patent 2,585,959, has the desired characteristics but must be modified in order to measure the ratio of two variables, and it will be clear from the description below that the changes necessary constitute invention. Whereas in the patent cited only one agent acts to produce two different effects in two elements of a special bridge circuit, in this invention two different agents or forces act to produce two different effects in two elements of a special bridge circuit capable of indicating the ratio of the magnitudes of the two different forces.

The principal object of this invention, therefore, is to provide a novel bridge circuit capable of recording or indicating the ratio of two non-electrical magnitudes.

Another object of this invention is to provide a novel bridge circuit containing resistances that can be mechanically varied by any means whatever so that a ratio of any two variable quantities can be converted into a ratio of the increases or the decreases in resistance of two similar bridge elements.

Other objects and advantages of the present invention will become apparent by consideration of the following description and the accompanying drawings.

Figure 1:
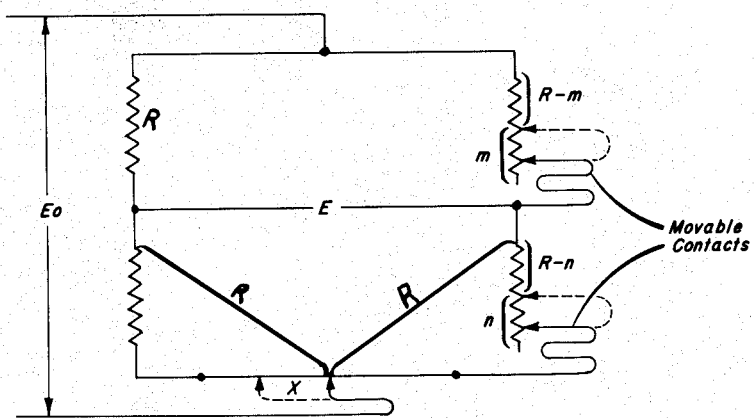
FIG. 1 is a schematic representation of a conventional Wheatstone bridge and is not a part of this invention but is submitted in connection with the discussion below.

Referring to FIG. 1 there is shown a conventional Wheatstone bridge with four resistances all of which are equal to R when the variable resistances on the right are in the zero position (maximum resistance) and when the sliding contact on the bottom is exactly in the middle of the slidewire. The bridge output E is then zero. If one variable resistance on the right is decreased by an amount $m$ and the other is decreased by an amount $n$ $(m<n)$ as shown by the dotted lines, then the slidewire contact at the bottom will have to be moved to the left to add resistance $x$ to $(R-n)$ and to substract a resistance $x$ from $R$ in order for E to become zero. When the bridge is in balance, we have from elementary Wheatstone bridge theory $$\frac{R}{R-x}=\frac{R-m}{R-n+x} \quad (1)$$

which reduces to $$\frac{m}{n}=\frac{R}{R-x}\left(\frac{n-2x}{n}\right) \quad (2)$$

Equation 2 shows that while it is possible with a conventional Wheatstone bridge to measure the ratio $$\frac{R-M}{R+x-n}$$

it is not possible to obtain a simple indication of the desired ratio of the resistance changes $$\frac{m}{n}$$

Figure 2:
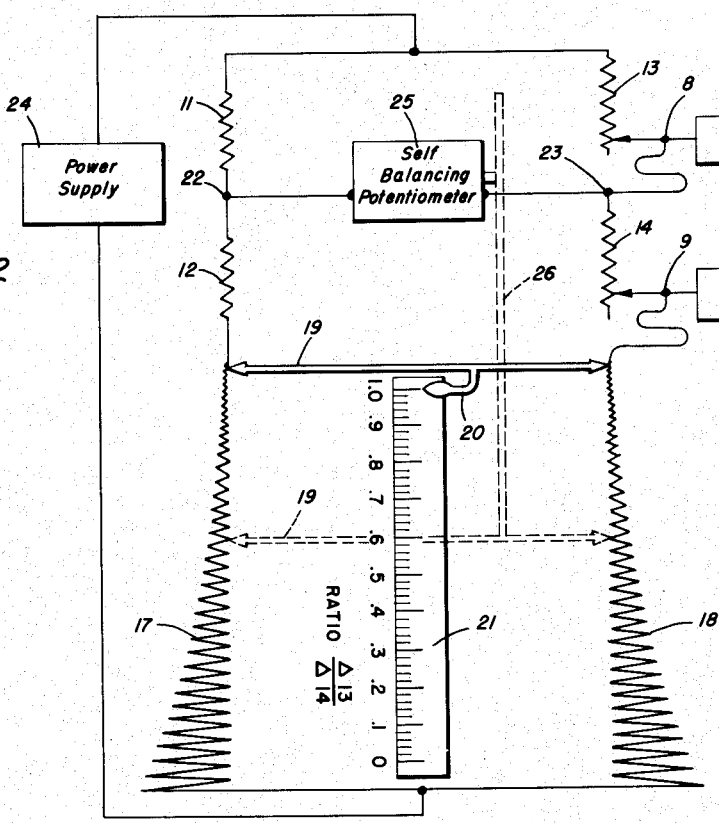
FIG. 2 is a schematic representation of the modified bridge circuit for indicating or recording the ratio of two variable magnitudes.

In the schematic representation of this invention shown in FIG. 2, 11 and 12 are similar fixed resistances, 13 and 14 are similar resistances which can be independently varied by suitably actuated mechanical means 15 and 16 to move sliding contacts 8 and 9. The combination of resistance 13, movable contact 8 and contact actuating means 15 constitute a transducer. Resistance 14, contact 9 and contact actuating means 16 form another transducer. If automatic contact actuating means 15 and 16 are omitted, contacts 8 and 9 can be manually operated to produce decreases in resistance of 13 and 14 and the circuit will indicate the ratio of the decreases in resistance so produced. Means for actuating contacts 8 and 9 are therefore not included as parts of this invention.

When no forces are applied to move contacts 8 and 9 from their normal position, resistances 13 and 14 have the same value R as resistances 11 and 12. 17 and 18 are suitable similar resistances, either linear or non-linear, 19 is a shorting-bar which can be actuated either manually or automatically by self-balancing potentiometer 25 and linkage 26 to make contact with 17 and 18 at any point so that the resistance $x$ is added to both arms of the bridge. Attached to shorting-bar 19 is a pointer 20 for indicating the distance the shorting-bar has been moved from its neutral position to some point on calibrated scale 21, which will give an indication of the ratio of the decrease in resistance 13 to the decrease in resistance 14 when the potential difference at points 22 and 23 is zero.

From elementary electrical theory when the potential difference between 22 and 23 is zero we have $$\frac{R}{R-m}=\frac{R+x}{(R-n)+x} \quad (3)$$

in which R is the resistance of 11 and 12 and of 13 and 14 when the force on movable contacts 8 and 9 is zero, $m$ is the decrease in resistance of element 13 due to the displacement of contact 8 by the action of 15, $n$ is the decrease in resistance of element 14 due to the displacement of contact 9 by the action of 16 $(m<n)$ and $x$ is the resistance added to both arms of the bridge to reduce the potential difference at points 22 and 23 to zero.

The value of the ratio $(m/n)$ is from (3)

$$\frac{m}{n}=\frac{R}{R+x} \quad (4)$$

By comparing Equation 4 with Equation 2 it can be seen that the modified bridge circuit of FIG. 2 gives a simple indication of the ratio $(m/n)$ whereas the conventional Wheatstone bridge in FIG. 1 gives a value for the ratio that cannot be indicated.

From (4) the value of the resistance $x$ to be added to both sides of the bridge is $$x = R\left(\frac{1 - \frac{m}{n}}{\frac{m}{n}}\right) \quad (5)$$

If R has the value 35 ohms, for example, the values of $x$ for given values of $(m/n)$ are shown in the table below.

| Value of ratio (m/n) | x ohms, for R 35 ohms |
|---|---|
| 1.00 | 0 |
| 0.90 | 3.9 |
| 0.80 | 8.75 |
| 0.70 | 15.00 |
| 0.60 | 23.30 |
| 0.50 | 35.00 |
| 0.40 | 52.50 |
| 0.30 | 82.00 |
| 0.20 | 140.00 |
| 0.10 | 665.00 |
| 0 | ∞ |

It can be seen from the table above that if scale 21 is calibrated linearly, resistors 17 and 18 will have to be wound non-linearly. Although the table shows how the values of $x$ vary as the ratio $(m/n)$ varies from 0 to 1.00, it is obvious that in most cases it will be necessary to indicate variations in the ratio $(m/n)$ between rather narrow limits, such as for example between 1.00 and 0.7, etc., in which case the degree of resolution of the scale will be much greater than when the scale is calibrated from 0 to 1.00.

While this invention has been illustrated above in a single embodiment, it is understood that modifications and variations may be made without departing from the spirit and scope of the invention as defined by the appended claims.

What is claimed is:

1. Ratio-measuring electrical circuit comprising two exactly similar combinations of resistances in parallel including in the first combination two equal fixed reference resistances in series, in the second combination two equal independently variable resistances in series for creating a potential difference between two fixed points, one lying between said reference resistances and the other lying between said independently variable resistances, a pair of equal fixed calibrated resistances suitably connected in each of the two combinations, means for cross-connecting at similar calibrated points exactly equal portions of said equal fixed calibrated resistances to reduce to zero any potential difference between said two fixed points, power supply means for energizing the circuit and a scale suitably calibrated to indicate the desired ratio.

2. Ratio measuring electrical network comprising in combination a first pair of equal in-parallel resistances one of which can be varied so as to create a potential difference between two suitably located fixed points in the network, a second pair of equal in-parallel resistances one of which can be independently varied so as to create an opposite potential difference between said two fixed points, a pair of equal similarly calibrated in-parallel resistances each connected directly to a member of said second pair of equal in-parallel resistances, means for cross-connecting at similar calibrated points exactly equal portions of said pair of fixed calibrated resistances to reduce to zero any potential difference at said two fixed points, power supply means for energizing the network and a scale suitably calibrated to indicate the desired ratio.

References Cited in the file of this patent
UNITED STATES PATENTS

| | | |
|---|---|---|
| 1,306,069 | McDonald | June 10, 1919 |
| 1,976,310 | Tuttle | Oct. 9, 1934 |
| 2,065,805 | Harrison | Dec. 29, 1936 |
| 2,416,059 | Marchment | Feb. 18, 1947 |